United States Patent
Tanaka et al.

(10) Patent No.: US 9,068,083 B2
(45) Date of Patent: Jun. 30, 2015

(54) METHOD OF PRODUCING GALLIUM PHTHALOCYANINE CRYSTAL AND METHOD OF PRODUCING ELECTROPHOTOGRAPHIC PHOTOSENSITIVE MEMBER USING THE METHOD OF PRODUCING GALLIUM PHTHALOCYANINE CRYSTAL

(71) Applicant: CANON KABUSHIKI KAISHA, Tokyo (JP)

(72) Inventors: Masato Tanaka, Tagata-gun (JP); Masataka Kawahara, Mishima (JP); Kaname Watariguchi, Mishima (JP); Takeshi Murakami, Numazu (JP); Akira Yoshida, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/688,880

(22) Filed: Nov. 29, 2012

(65) Prior Publication Data
US 2013/0137032 A1    May 30, 2013

(30) Foreign Application Priority Data

Nov. 30, 2011   (JP) ................................ 2011-262020
Nov. 6, 2012    (JP) ................................ 2012-244472

(51) Int. Cl.
| | |
|---|---|
| G03G 5/06 | (2006.01) |
| C09B 67/50 | (2006.01) |
| C09B 67/04 | (2006.01) |
| G03G 5/05 | (2006.01) |
| G03G 5/147 | (2006.01) |
| C09B 67/12 | (2006.01) |

(52) U.S. Cl.
CPC ......... *C09B 67/0026* (2013.01); *C09B 67/0002* (2013.01); *G03G 5/0542* (2013.01); *G03G 5/0564* (2013.01); *G03G 5/0614* (2013.01); *G03G 5/0696* (2013.01); *G03G 5/14756* (2013.01); *C09B 67/0016* (2013.01)

(58) Field of Classification Search
CPC ............ C09B 67/0026; C09B 67/0016; C09B 67/0002; G03G 5/0696; G03G 5/0614
USPC .......................... 540/141; 430/59.4, 78, 133
See application file for complete search history.

(56) References Cited

U.S. PATENT DOCUMENTS

| | | | |
|---|---|---|---|
| 4,908,329 A | 3/1990 | Kanai et al. | |
| 4,908,330 A | 3/1990 | Arai et al. | |
| 5,006,435 A | 4/1991 | Akasaki et al. | |
| 5,194,353 A | 3/1993 | Tanaka et al. | |
| 5,246,807 A | 9/1993 | Kanemaru et al. | |
| 5,389,478 A | 2/1995 | Yoshida et al. | |
| 5,393,627 A | 2/1995 | Nakamura et al. | |
| 5,453,342 A | 9/1995 | Go et al. | |
| 5,463,041 A | 10/1995 | Nukada et al. | |
| 5,464,718 A | 11/1995 | Kashizaki et al. | |
| 5,527,653 A | 6/1996 | Tanaka | |
| 5,561,015 A | 10/1996 | Yoshida et al. | |
| 5,629,116 A | 5/1997 | Kashizaki et al. | |
| 5,666,589 A | 9/1997 | Yoshinaga et al. | |
| 5,759,291 A | 6/1998 | Ichinose et al. | |
| 5,811,212 A | 9/1998 | Tanaka | |
| 5,818,489 A | 10/1998 | Yoshinaga et al. | |
| 5,876,888 A | 3/1999 | Anayama et al. | |
| 5,910,386 A | 6/1999 | Yoshinaga et al. | |
| 5,912,098 A | 6/1999 | Tanaka et al. | |
| 6,040,100 A | 3/2000 | Tanaka et al. | |
| 6,093,515 A | 7/2000 | Yoshida et al. | |
| 6,139,997 A | 10/2000 | Tanaka et al. | |
| 6,146,800 A | 11/2000 | Yoshida et al. | |
| 6,183,922 B1 | 2/2001 | Takai et al. | |
| 6,190,811 B1 | 2/2001 | Tanaka et al. | |
| 6,218,063 B1 | 4/2001 | Tanaka et al. | |
| 6,245,472 B1 | 6/2001 | Tanaka | |
| 6,248,490 B1 | 6/2001 | Suzuki et al. | |
| 6,258,498 B1 | 7/2001 | Kawahara et al. | |
| 6,270,936 B1 | 8/2001 | Tanaka et al. | |
| 6,296,978 B1 | 10/2001 | Takaya et al. | |

(Continued)

FOREIGN PATENT DOCUMENTS

| | | |
|---|---|---|
| CN | 101101459 A | 1/2008 |
| CN | 101167022 A | 4/2008 |
| CN | 102314103 A | 1/2012 |
| EP | 2 402 819 A1 | 1/2012 |
| JP | 5-224439 A | 9/1993 |
| JP | 6-1923 A | 1/1994 |
| JP | 6-273953 A | 9/1994 |
| JP | 2001-40237 A | 2/2001 |
| JP | 2006-72304 A | 3/2006 |
| JP | 2011-94101 A | 5/2011 |

OTHER PUBLICATIONS

Diamond, A.S., ed., Handbook of Imaging Materials, Marcel Dekker, Inc., NY (1991), pp. 395-396.*
Kawahara, et al., U.S. Appl. No. 13/688,846, filed Nov. 29, 2012.
European Search Report dated Mar. 25, 2013 in European Application No. 12194743.6.
Chinese Office Action dated Jul. 21, 2014 in Chinese Application No. 201210500589.2.

(Continued)

*Primary Examiner* — Janis L Dote
(74) *Attorney, Agent, or Firm* — Fitzpatrick, Cella, Harper and Scinto

(57) ABSTRACT

Provided is a method of producing an electrophotographic photosensitive member having improved sensitivity and capable of outputting an image having less image defects due to a ghost phenomenon not only under a normal-temperature, normal-humidity environment but also under a low-temperature, low-humidity environment as a particularly severe condition. The method of producing a gallium phthalocyanine crystal includes subjecting a gallium phthalocyanine and a specific amine compound, which are added to a solvent, to a milling treatment to perform crystal transformation of the gallium phthalocyanine. In addition, the gallium phthalocyanine crystal is used in the photosensitive layer of the electrophotographic photosensitive member.

12 Claims, 2 Drawing Sheets

(56) References Cited

U.S. PATENT DOCUMENTS

| | | |
|---|---|---|
| 6,335,132 B1 | 1/2002 | Tanaka et al. |
| 6,391,505 B1 | 5/2002 | Hamasaki et al. |
| 6,472,524 B2 | 10/2002 | Tanaka |
| 6,551,752 B2 | 4/2003 | Takaya et al. |
| 6,623,899 B2 | 9/2003 | Takaya et al. |
| 6,683,175 B2 | 1/2004 | Tanaka |
| 6,773,856 B2 | 8/2004 | Tanaka et al. |
| 6,833,227 B2 | 12/2004 | Tanaka |
| 6,942,952 B2 | 9/2005 | Uesugi et al. |
| 6,991,881 B2 | 1/2006 | Ogaki et al. |
| 7,001,699 B2 | 2/2006 | Tanaka et al. |
| 7,245,851 B2 | 7/2007 | Fujii et al. |
| 7,276,318 B2 | 10/2007 | Fujii et al. |
| 7,333,752 B2 | 2/2008 | Kawahara et al. |
| 7,517,626 B2 | 4/2009 | Fujii et al. |
| 7,551,878 B2 | 6/2009 | Ogaki et al. |
| 7,585,604 B2 | 9/2009 | Ogaki et al. |
| 7,622,238 B2 | 11/2009 | Uematsu et al. |
| 7,629,102 B2 | 12/2009 | Ochi et al. |
| 7,718,331 B2 | 5/2010 | Uematsu et al. |
| 7,727,692 B2 | 6/2010 | Yamada et al. |
| 7,749,667 B2 | 7/2010 | Kawahara et al. |
| 7,910,274 B2 | 3/2011 | Tanaka et al. |
| 7,927,774 B2 | 4/2011 | Ogaki et al. |
| 8,088,541 B2 | 1/2012 | Tanaka et al. |
| 2006/0014090 A1* | 1/2006 | Shiino et al. ............... 430/59.1 |
| 2009/0061340 A1 | 3/2009 | Lin et al. |
| 2011/0045390 A1 | 2/2011 | Tanaka |
| 2011/0076614 A1 | 3/2011 | Tanaka |
| 2011/0293323 A1 | 12/2011 | Tanaka et al. |
| 2012/0003576 A1 | 1/2012 | Tanaka et al. |
| 2012/0033994 A1 | 2/2012 | Tanaka et al. |
| 2013/0137023 A1 | 5/2013 | Watariguchi et al. |
| 2013/0137025 A1 | 5/2013 | Kawahara et al. |

* cited by examiner

METHOD OF PRODUCING GALLIUM PHTHALOCYANINE CRYSTAL AND METHOD OF PRODUCING ELECTROPHOTOGRAPHIC PHOTOSENSITIVE MEMBER USING THE METHOD OF PRODUCING GALLIUM PHTHALOCYANINE CRYSTAL

BACKGROUND OF THE INVENTION

1. Field of the Invention

The present invention relates to a method of producing a gallium phthalocyanine crystal and a method of producing an electrophotographic photosensitive member using the method of producing a gallium phthalocyanine crystal.

2. Description of the Related Art

Conventionally, a phthalocyanine-based pigment has been attracting attention, and has been investigated, as an electronic material to be used in an electrophotographic photosensitive member, a solar cell, a sensor, or the like in addition to its application for coloring.

An oscillation wavelength of semiconductor laser, which has been frequently used as an image exposing unit for an electrophotographic photosensitive member, is, at present, a long wavelength such as 650 to 820 nm. Accordingly, development of an electrophotographic photosensitive member having high sensitivity to light having such a long wavelength has been advanced.

The phthalocyanine pigment is effective as a charge-generating substance having high sensitivity to light having a wavelength in such a long-wavelength region. In particular, oxytitanium phthalocyanine and gallium phthalocyanine have excellent sensitivity characteristics, and various crystal forms thereof have been reported heretofore.

An electrophotographic photosensitive member using the phthalocyanine pigment has an excellent sensitivity characteristic. However, the electrophotographic photosensitive member involves the following problem. A produced photocarrier is liable to remain on the photosensitive layer of the electrophotographic photosensitive member and is liable to serve as a kind of memory to cause an electric potential variation such as a ghost phenomenon.

The following has also been found. In the case where gallium phthalocyanines each are used in an electrophotographic photosensitive member, changes in electrophotographic characteristics of the electrophotographic photosensitive member significantly occur depending on the differences in production methods such as a raw material and a solvent to be used, and in production conditions such as a reaction temperature and a loading ratio even when the crystal forms of the gallium phthalocyanines are the same. In particular, the resultant electrophotographic photosensitive members significantly differ from each other in sensitivity and chargeability.

Japanese Patent Application Laid-Open No. 2001-40237 reports that addition of a specific organic electron acceptor at the time of an acid pasting process for the phthalocyanine pigment exerts a sensitizing effect. However, the approach involves the following concern and problem. The additive may chemically change, thereby being difficult to transform the additive into a desired crystal form.

In addition, Japanese Patent Application Laid-Open No. 2006-72304 reports the following. When the pigment and a specific organic electron acceptor are subjected to a wet pulverization treatment, the organic electron acceptor is incorporated in a surface of the crystal simultaneously with crystal transformation, and hence the electrophotographic character-istics are improved. However, even in a case where the specific organic electron acceptor is incorporated in the surface of the crystal, it is identical in constitution and effect to the so-called addition at the time of dispersion in which the same organic electron acceptor is added at the time of production of a coating liquid for a charge-generating layer.

As described above, various improvements have been attempted for an electrophotographic photosensitive member.

An additional improvement in sensitivity and the alleviation of deterioration of image quality due to the ghost phenomenon have been desired in association with an increase in print speed and an improvement in quality of a printed image in recent years. However, it has been difficult to achieve compatibility between the additional improvement in sensitivity and the improvement in image quality owing to existence of the following dilemma. When an attempt is made to improve the sensitivity, the ghost phenomenon is exacerbated.

SUMMARY OF THE INVENTION

In view of the foregoing, the present invention is directed to providing a gallium phthalocyanine crystal having excellent characteristics as a charge-generating substance capable of solving the problems.

Further, the present invention is directed to providing a method of producing an electrophotographic photosensitive member having additionally improved sensitivity and capable of outputting an image having less image defects due to the ghost phenomenon not only under a normal-temperature, normal-humidity environment but also under a low-temperature, low-humidity environment as a particularly severe condition.

The present invention provides a method of producing a gallium phthalocyanine crystal, including subjecting a gallium phthalocyanine and an amine compound represented by the following formula (1), which are added to a solvent, to a milling treatment to perform crystal transformation of the gallium phthalocyanine:

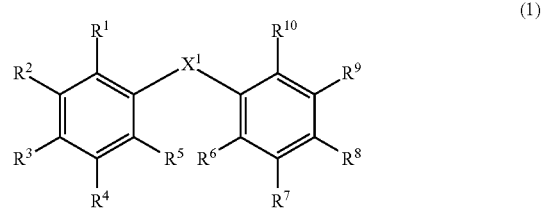

in the formula (1): $R^1$ to $R^{10}$ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and $X^1$ represents one of a carbonyl group and a dicarbonyl group.

The present invention also provides a method of producing an electrophotographic photosensitive member including a support and a photosensitive layer formed on the support, the photosensitive layer containing a gallium phthalocyanine crystal, the method including producing the photosensitive layer with the gallium phthalocyanine crystal obtained by the above-described production method.

According to the present invention, there is provided the gallium phthalocyanine crystal having excellent characteristics as a charge-generating substance.

Further, according to the present invention, provided is the method of producing the electrophotographic photosensitive member having additionally improved sensitivity and capable of outputting an image having less image defects due to the ghost phenomenon not only under a normal-temperature, normal-humidity environment but also under a low-temperature, low-humidity environment as a particularly severe condition.

Further features of the present invention will become apparent from the following description of exemplary embodiments with reference to the attached drawings.

DESCRIPTION OF THE EMBODIMENTS

Figure 1:
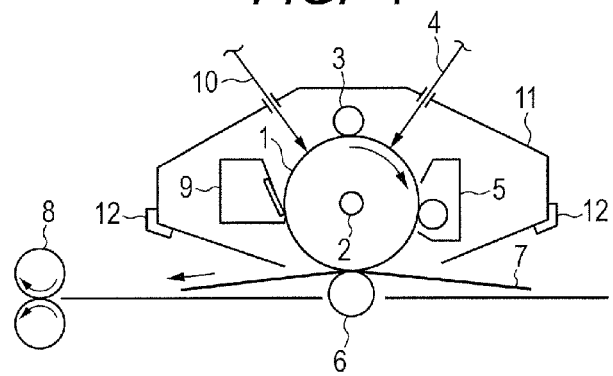
FIG. 1 is a view illustrating an example of the schematic configuration of an electrophotographic apparatus provided with a process cartridge having an electrophotographic photosensitive member of the present invention.

A method of producing a gallium phthalocyanine crystal of the present invention includes subjecting a gallium phthalocyanine and an amine compound represented by the following formula (1), which are added to a solvent, to a milling treatment to perform crystal transformation of the gallium phthalocyanine:

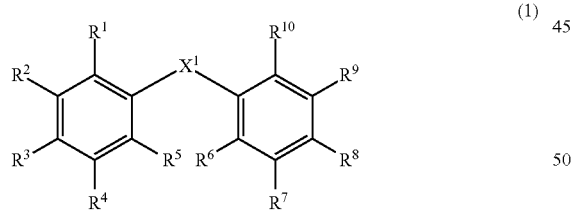

(1)

in the formula (1):

$R^1$ to $R^{10}$ each independently represent one of a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, and a substituted or unsubstituted cyclic amino group, provided that at least one of $R^1$ to $R^{10}$ represents one of an amino group substituted with a substituted or unsubstituted aryl group, an amino group substituted with a substituted or unsubstituted alkyl group, and a substituted or unsubstituted cyclic amino group; and $X^1$ represents one of a carbonyl group and a dicarbonyl group.

In addition, at least one of $R^1$ to $R^{10}$ in the formula (1) preferably represents an amino group substituted with a substituted or unsubstituted alkyl group. Of such groups, it is more preferred that the substituted or unsubstituted alkyl group in the amino group substituted with the substituted or unsubstituted alkyl group be an alkyl group substituted with an alkoxy group, an alkyl group substituted with an aryl group, or an unsubstituted alkyl group.

Further, at least one of $R^1$ to $R^{10}$ in the formula (1) preferably represents a dialkylamino group. Of such groups, a dimethylamino group or a diethylamino group is more preferred.

Further, the amine compound particularly preferred in terms of a suppressing effect on an image defect due to a ghost phenomenon is an amine compound represented by the following formula (2).

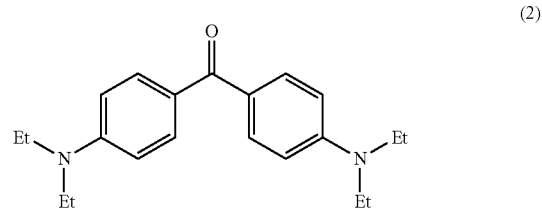

(2)

In the formula (2), Et represents an ethyl group.

In addition, at least one of $R^1$ to $R^{10}$ in the formula (1) preferably represents a substituted or unsubstituted cyclic amino group. Of such groups, a morpholino group or a 1-piperidino group is more preferred.

Further, the amine compound particularly preferred in terms of an improving effect on sensitivity is an amine compound represented by the following formula (3).

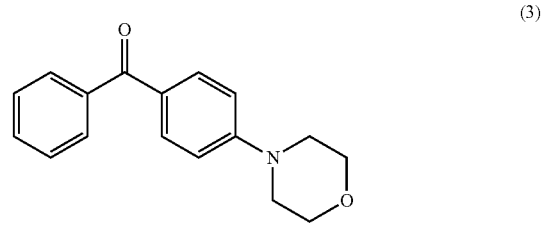 [SMILES: O=C(c1ccccc1)c1ccc(N2CCOCC2)cc1]

(3)

Hereinafter, a preferred specific example (Exemplified Compound) of an amine compound to be used in the present invention is described, however, the present invention is not limited thereto.

Exemplified Compound

Exemplified Compound (1)

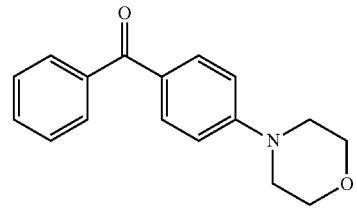

Exemplified Compound (2)
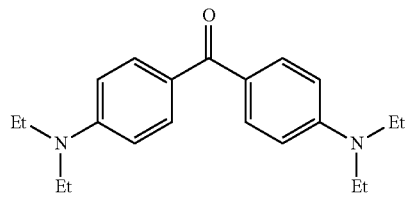
Exemplified Compound (3)
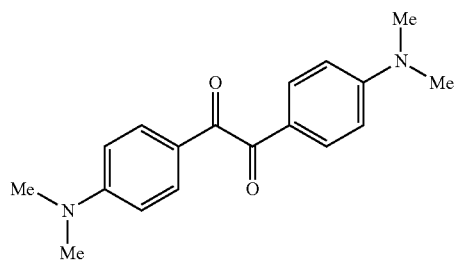
Exemplified Compound (4)
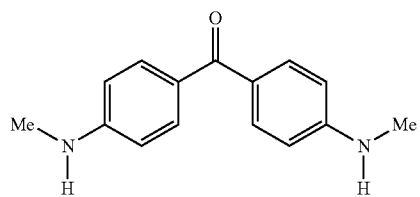
Exemplified Compound (5)
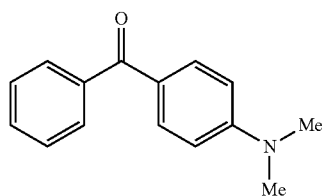
Exemplified Compound (6)
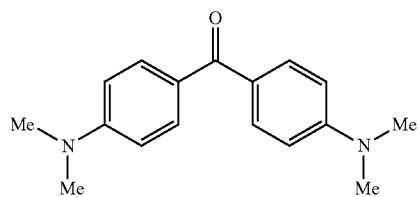
Exemplified Compound (7)
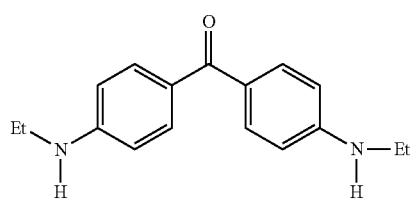
Exemplified Compound (8)
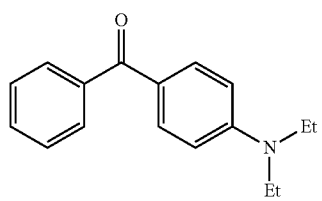
Exemplified Compound (9)
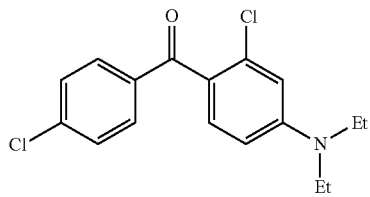
Exemplified Compound (10)
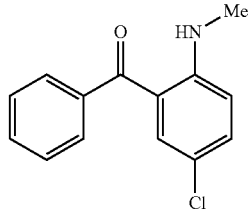
Exemplified Compound (11)
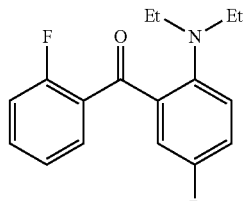
Exemplified Compound (12)
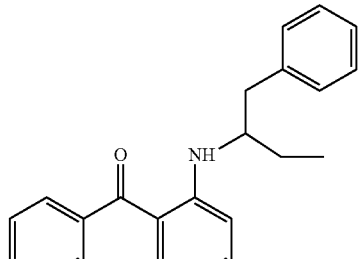
Exemplified Compound (13)
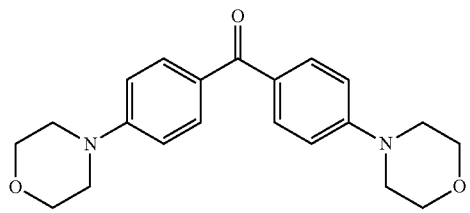
Exemplified Compound (14)
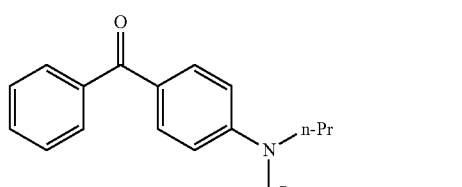
Exemplified Compound (15)
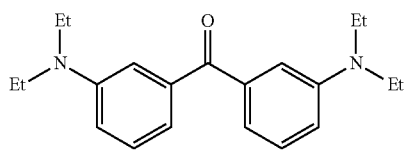

Exemplified Compound (16)

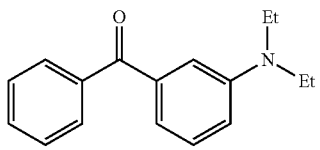

Exemplified Compound (17)

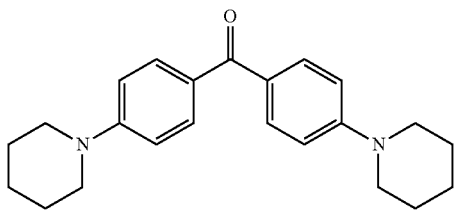

Exemplified Compound (18)

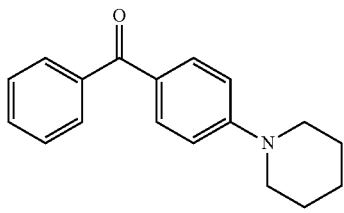

Exemplified Compound (19)

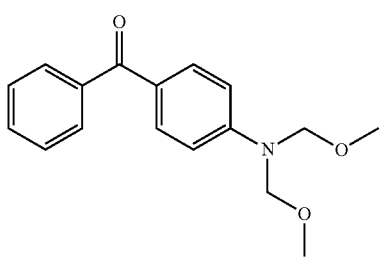

Exemplified Compound (20)

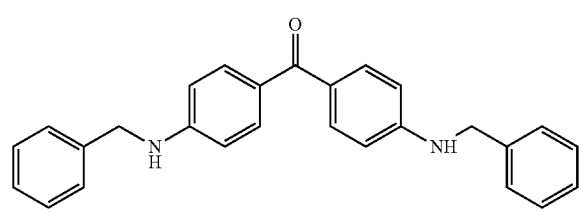

Exemplified Compound (21)

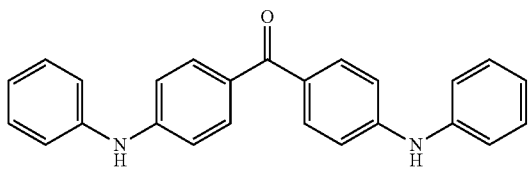

Exemplified Compound (22)

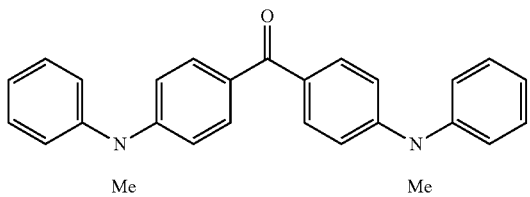

Exemplified Compound (23)

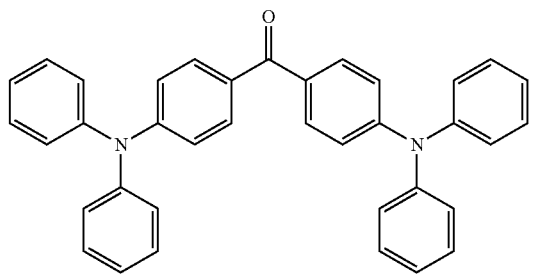

Exemplified Compound (24)

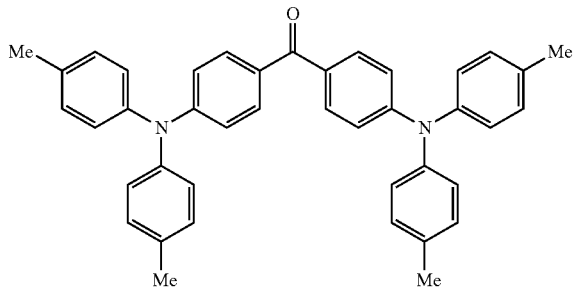

In the exemplified compounds, Me represents a methyl group, Et represents an ethyl group, and n-Pr represents a propyl group (n-propyl group).

An example of a method of synthesizing the amine compound to be used in the present invention, which is available as a commercial product, is described below.

Aminobenzophenone is used as a raw material, and a substituent can be introduced to an amino group by a substitution reaction between aminobenzophenone and a halide. Of such reactions, a reaction between aminobenzophenone and an aromatic halide using a metal catalyst is a method useful for the synthesis of an aryl group-substituted amine compound. In addition, a reaction using reductive amination is a method useful for the synthesis of an alkyl group-substituted amine compound.

Hereinafter, a specific synthetic example of Exemplified Compound (24) is shown.

The term "part(s)" shown below means "part (s) by mass." In addition, an infrared (IR) absorption spectrum was measured with a Fourier transform infrared spectrophotometer (trade name: FT/1R-420, manufactured by JASCO Corporation). Further, a nuclear magnetic resonance (NMR) spectrum was measured with a nuclear magnetic resonance apparatus (trade name: EX-400, manufactured by JEOL RESONANCE Inc.).

SYNTHESIS EXAMPLE

Synthesis of Exemplified Compound (24)

5.0 Parts of 4,4'-diaminobenzophenone, 25.7 parts of iodotoluene, 9.0 parts of copper powder, and 9.8 parts of potassium carbonate were added to a three-necked flask containing 50 parts of N,N-dimethylacetamide, and then the mixture was refluxed for 20 hours. After that, a solid component was removed by hot filtration. The solvent was removed by distillation under reduced pressure and then the residue was purified with a silica gel column (using toluene as a solvent). Thus, 8.1 parts of Exemplified Compound (24) were obtained.

Characteristic peaks of an IR absorption spectrum and a $^1$H-NMR spectrum obtained by measurement are described below.

IR (cm$^{-1}$, KBr): 1646, 1594, 1508, 1318, 1277, and 1174

$^1$H-NMR (ppm, CDCl$_3$, 40°): δ=7.63 (d, 4H), 7.11 (d, 8H), 7.04 (d, 8H), 6.93 (d, 4H), and 2.33 (s, 12H)

The gallium phthalocyanine to be subjected to the milling treatment together with the formula (1) in the solvent of the present invention is, for example, a gallium phthalocyanine having a halogen atom, a hydroxy group, or an alkoxy group as an axial ligand at a gallium atom in a molecule thereof. A gallium phthalocyanine may have a substituent such as a halogen atom in its phthalocyanine ring.

Of such gallium phthalocyanines, hydroxygallium phthalocyanines (in which a gallium atom has a hydroxy group as an axial ligand), bromogallium phthalocyanines (in which a gallium atom has a bromine atom as an axial ligand), or iodogallium phthalocyanines (in which a gallium atom has an iodine atom as an axial ligand) each having excellent sensitivity are preferred.

Further, a low-crystalline hydroxygallium phthalocyanine treated by an acid pasting method is preferred because the present invention effectively acts.

In addition, the gallium phthalocyanine crystal to be obtained by the production method of the present invention is preferably a hydroxygallium phthalocyanine crystal because the hydroxygallium phthalocyanine crystal has excellent characteristics as a charge-generating substance. Of such crystals, a hydroxygallium phthalocyanine crystal having peaks at Bragg angles 2θ±0.2° of 7.4° and 28.3° in CuKα X-ray diffraction is particularly preferred.

The milling treatment process to be performed in the solvent in the present invention is described.

The milling treatment to be performed here is, for example, a treatment to be performed with a milling apparatus such as a sand mill and a ball mill together with a dispersant such as a glass bead, a steel bead, and an alumina ball. A milling time is preferably about 4 to 60 hours. A particularly preferred method is as described below. The sample is taken every 4 to 8 hours and the Bragg angle of the crystal is identified. The amount of the dispersant to be used in the milling treatment is preferably 10 to 50 times as large as that of the gallium phthalocyanine on a mass basis.

The usage of the solvent is preferably 5 to 30 times as large as that of the gallium phthalocyanine on a mass basis. The usage of the amine compound represented by the formula (1) is preferably 0.1 to 10 times as large as that of the gallium phthalocyanine on a mass basis.

In addition, examples of the solvent to be used include: an amide-based solvent such as N,N-dimethylformamide, N,N-dimethylacetamide, N-methylformamide, N-methylacetamide, N-methylpropioamide, and N-methyl-2-pyrrolidone; a halogen-based solvent such as chloroform; an ether-based solvent such as tetrahydrofuran; and a sulfoxide-based solvent such as dimethyl sulfoxide.

Of those, at least one kind selected from an amide-based solvent and a sulfoxide-based solvent is preferred in terms of an effect of the present invention. Further, at least one kind selected from N,N-dimethylformamide and a dimethyl sulfoxide solvent is particularly preferred.

In the present invention, whether the gallium phthalocyanine crystal obtained by the present invention contained the amine compound represented by the formula (1) in itself was determined by analyzing data on the X-ray diffraction measurement and NMR measurement of the resultant gallium phthalocyanine crystal.

The X-ray diffraction measurement and NMR measurement of the phthalocyanine crystal of the present invention were performed under the following conditions.

(Powder X-Ray Diffraction Measurement)

Used measuring apparatus: X-ray diffractometer RINT-TTRII manufactured by Rigaku Corporation X-ray tube bulb: Cu Tube voltage: 50 KV Tube current: 300 mA Scanning method: 2θ/θ scan Scanning rate: 4.0°/min Sampling interval: 0.02°

Start angle (2θ): 5.0°

Stop angle (2θ): 40.0°

Attachment: standard sample holder

Filter: not used

Incident monochrome: used

Counter monochromator: not used

Divergence slit: open

Divergence longitudinal restriction slit: 10.00 mm

Scattering slit: open

Light-receiving slit: open

Flat monochromator: used

Counter: scintillation counter (NMR Measurement)

Used measuring apparatus: AVANCE III 500 manufactured by BRUKER

Solvent: deuterated sulfuric acid (D$_2$SO$_4$)

The gallium phthalocyanine crystal obtained in the present invention is excellent in function as a photoconductor and is hence applicable to a solar cell, a sensor, a switching element, or the like as well as to an electrophotographic photosensitive member.

Next, the case where the gallium phthalocyanine crystal obtained in the present invention is applied as a charge-generating substance in an electrophotographic photosensitive member is described.

Photosensitive layers are classified into a photosensitive layer formed of a single layer containing both the charge-generating substance and a charge-transporting substance (single-layer photosensitive layer), and a photosensitive layer obtained by laminating a charge-generating layer containing the charge-generating substance and a charge-transporting layer containing the charge-transporting substance (laminated photosensitive layer). It should be noted that the charge-generating layer may be laminated on the charge-transporting layer and vice versa.

The support to be used in the present invention is preferably a support having electro-conductivity (electro-conductive support). As the support, there may be used, for example, aluminum, an aluminum alloy, copper, zinc, stainless, vanadium, molybdenum, chromium, titanium, nickel, indium, gold, and platinum. In addition, there may be used: a plastic (e.g., a polyethylene, a polypropylene, a polyvinyl chloride, a polyethylene terephthalate, an acrylic resin, and a polyfluoroethylene) having a layer of aluminum, an aluminum alloy, indium oxide, tin oxide, or an indium oxide-tin oxide alloy formed into a film by vacuum vapor deposition; a support obtained by coating a plastic or the above-mentioned support with electro-conductive particles (e.g., aluminum particles, titanium oxide particles, tin oxide particles, zinc oxide particles, carbon black, and silver particles) and a binder resin; a support obtained by impregnating a plastic or paper with electro-conductive particles; a plastic including an electro-conductive polymer; and the like.

In the present invention, an undercoat layer having a barrier function and an adhesion function (sometimes referred to as "barrier layer" or "intermediate layer") may be provided between the support and the photosensitive layer.

As the material for the undercoat layer, there may be used a polyvinyl alcohol, a polyethylene oxide, ethyl cellulose, methyl cellulose, casein, polyamides (e.g., nylon 6, nylon 66, nylon 610, a copolymer nylon, and an N-alkoxymethylated nylon), a polyurethane, glue, aluminum oxide, gelatin, and the like. The thickness of the undercoat layer is 0.1 to 10 µm, preferably 0.5 to 5 µm.

When the single-layer photosensitive layer is formed, the formation thereof can be performed by: mixing the charge-generating substance made of the gallium phthalocyanine crystal according to the present invention and the charge-transporting substance into a binder resin solution; applying the mixed liquid onto the support; and drying the resultant applied film.

When the laminated photosensitive layer is formed, the charge-generating layer can be formed by: applying a coating liquid for a charge-generating layer obtained by dispersing the gallium phthalocyanine crystal according to the present invention in a binder resin solution; and drying the resultant applied film. Alternatively, the charge-generating layer can be formed by vapor deposition.

The charge-transporting layer may be formed by: applying a coating liquid for a charge-transporting layer obtained by dissolving the charge-transporting substance and a binder resin in a solvent; and drying the resultant applied film.

Examples of the charge-transporting substance include a triarylamine-based compound, a hydrazone-based compound, a stilbene-based compound, a pyrazoline-based compound, an oxazole-based compound, a thiazole-based compound, and a triarylmethane-based compound.

Examples of the binding resin to be used for each layer include resins such as a polyester, an acrylic resin, a polyvinylcarbazole, a phenoxy resin, a polycarbonate, a polyvinyl butyral, a polystyrene, a polyvinyl acetate, a polysulfone, a polyarylate, vinylidene chloride, an acrylonitrile copolymer, and a polyvinyl benzal.

An application method such as a dipping method, a spray coating method, a spinner coating method, a bead coating method, a blade coating method, and a beam coating method can be used as a method of applying the photosensitive layer.

When the photosensitive layer is of a single-layer type, its thickness is preferably 5 to 40 µm, more preferably 10 to 30 µm.

When the photosensitive layer is of a laminated type, the thickness of the charge-generating layer is preferably 0.01 to 10 µm, more preferably 0.1 to 3 µm. In addition, the thickness of the charge-transporting layer is preferably 5 to 40 µm, more preferably 10 to 30 µm.

When the photosensitive layer is of a laminated type, the content of the charge-generating substance is preferably 20 to 90 mass %, more preferably 50 to 80 mass % with respect to the total mass of the charge-generating layer. In addition, the content of the charge-transporting substance is preferably 20 to 80 mass %, more preferably 30 to 70 mass % with respect to the total mass of the charge-transporting layer.

When the photosensitive layer is of a single-layer type, the content of the charge-generating substance is preferably 3 to 30 mass % with respect to the total mass of the photosensitive layer. In addition, the content of the charge-transporting substance is preferably 30 to 70 mass % with respect to the total mass of the photosensitive layer.

When the gallium phthalocyanine crystal according to the present invention is used as a charge-generating substance, the substance can be mixed with any other charge-generating substance before use. In this case, the content of the gallium phthalocyanine crystal is preferably mass % or more with respect to all charge-generating substances.

A protective layer may be provided on the photosensitive layer as required. The protective layer can be formed by: applying a coating liquid for the protective layer, which is obtained by dissolving a resin such as a polyvinyl butyral, a polyester, a polycarbonate (e.g., a polycarbonate Z and a modified polycarbonate), a nylon, a polyimide, a polyarylate, a polyurethane, a styrene-butadiene copolymer, a styrene-acrylic acid copolymer, and a styrene-acrylonitrile copolymer in an organic solvent, onto the photosensitive layer; and drying the resultant applied film.

The thickness of the protective layer is preferably 0.05 to 20 µm.

An electro-conductive particle, a UV absorber, or the like may be incorporated into the protective layer. Examples of the electro-conductive particle include metal oxide particles such as a tin oxide particle.

FIG. 1 is a view illustrating an example of the schematic configuration of an electrophotographic apparatus provided with a process cartridge having the electrophotographic photosensitive member of the present invention.

A cylindrical (drum-shaped) electrophotographic photosensitive member 1 is rotationally driven about an axis 2 in a direction indicated by an arrow at a predetermined peripheral speed (process speed).

The surface of the electrophotographic photosensitive member 1 is charged to a predetermined positive or negative electric potential by a charging unit 3 during the rotation process. Next, the charged surface of the electrophotographic photosensitive member 1 is irradiated with image exposure light 4 from an image exposing unit (not shown) and then an electrostatic latent image corresponding to target image information is formed. The image exposure light 4 is, for example, light to be output from the image exposing unit such as a slit exposure and a laser beam scanning exposure, the light having intensity modulated in correspondence with a time-series electrical digital image signal of the target image information.

The electrostatic latent image formed on the surface of the electrophotographic photosensitive member 1 is developed (subjected to normal development or reversal development) with toner stored in a developing unit 5. Thus, a toner image is formed on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to the charge which the toner possesses is applied from a bias power source (not shown) to the transferring unit 6. In addition, when the transfer material 7 is paper, the transfer material 7 is taken out of a sheet-feeding portion (not shown), and is then fed into a gap between the electrophotographic photosensitive member 1 and the transferring unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1 and then conveyed to an image fixing unit 8 where the transfer material is subjected to a treatment for fixing the toner image. Thus, the transfer material is printed out as an image-formed product (print or copy) to the outside of the electrophotographic apparatus.

The surface of the electrophotographic photosensitive member 1 after the transfer of the toner image onto the transfer material 7 is subjected to the removal of an attached matter such as the toner (transfer residual toner) by a cleaning unit 9, thereby being cleaned. A cleaner-less system has been developed in recent years and hence the transfer residual toner can be directly removed with developing equipment or the like. Further, the surface of the electrophotographic photosensitive member 1 is subjected to a neutralization treatment by pre-exposure light 10 from pre-exposing unit (not shown) before being repeatedly used for image formation. It should be noted that when the charging unit 3 is a contact charging unit using a charging roller or the like, the pre-exposing unit is not necessarily needed.

In the present invention, the following configuration can be adopted. Multiple components out of the components such as the electrophotographic photosensitive member 1, the charging unit 3, the developing unit 5, and the cleaning unit 9 are stored in a container and integrally supported to form a process cartridge, and then the process cartridge can be detachably mountable to the main body of the electrophotographic apparatus. For example, the following configuration can be adopted. At least one selected from the charging unit 3, the developing unit 5, and the cleaning unit 9 is integrally supported with the electrophotographic photosensitive member 1 to provide a cartridge, and then the cartridge is used as a process cartridge 11 detachably mountable to the main body of the electrophotographic apparatus with a guiding unit 12 such as a rail of the main body of the electrophotographic apparatus.

When the electrophotographic apparatus is a copying machine or a printer, the image exposure light 4 may be reflected light or transmitted light from a manuscript. Alternatively, the light may be light radiated by, for example, scanning with a laser beam, the driving of an LED array, or the driving of a liquid crystal shutter array to be performed in accordance with a signal turned from the manuscript read with a sensor.

The electrophotographic photosensitive member 1 of the present invention is also widely applicable to the fields of application of electrophotography such as a laser beam printer, a CRT printer, an LED printer, a FAX, a liquid crystal printer, and laser plate making.

Hereinafter, the present invention is described in more detail by way of specific examples, provided that the present invention is not limited to these examples. It should be noted that the thickness of each layer of any one of the electrophotographic photosensitive members of examples and comparative examples was determined with an eddy-current thickness meter (FISCHERSCOPE manufactured by Fischer Instruments), or was determined from its mass per unit area by specific gravity conversion.

Example 1-1

Figure 2:
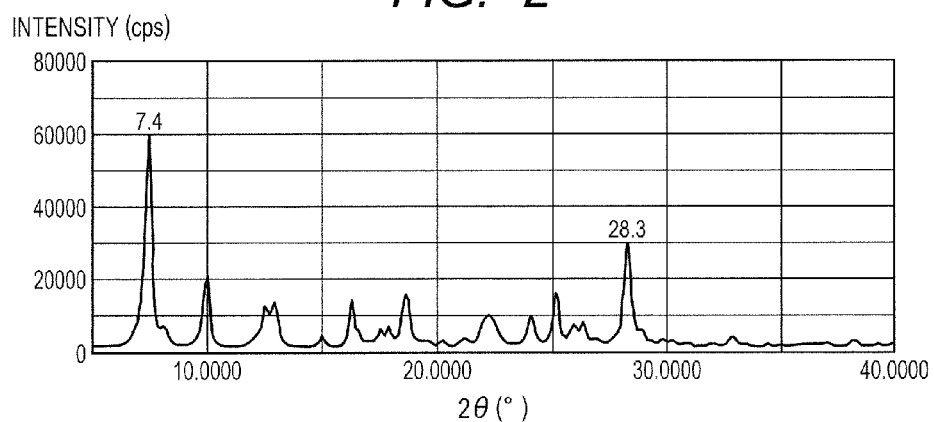
FIG. 2 is a powder X-ray diffraction pattern of a hydroxygallium phthalocyanine crystal obtained in Example 1-1.

0.5 Part of hydroxygallium phthalocyanine obtained by the same treatment as that of Example 1-1 subsequent to Synthesis Example 1 described in Japanese Patent Application Laid-Open No. 2011-94101, 1.0 part of Exemplified Compound (1) (product code: 159400050, manufactured by Acros Organics), and 10 parts of N,N-dimethylformamide were subjected to a milling treatment in a ball mill together with 20 parts of glass beads each having a diameter of 0.8 mm at room temperature (23° C.) for 40 hours. A gallium phthalocyanine crystal was taken out of the dispersion with N,N-dimethylformamide and filtered, and then the residue on the filter was sufficiently washed with tetrahydrofuran. The filter residue was vacuum-dried to yield 0.5 part of a hydroxygallium phthalocyanine crystal. FIG. 2 shows the powder X-ray diffraction pattern of the resultant crystal.

In addition, NMR measurement confirmed that Exemplified Compound (1) was incorporated at 0.31% into the crystal.

Example 1-2

0.45 Part of a hydroxygallium phthalocyanine crystal was obtained by the same treatment as that of Example 1-1 except that in Example 1-1, 1.0 part of Exemplified Compound (1) was changed to 2.0 parts of Exemplified Compound (1). The powder X-ray diffraction pattern of the resultant hydroxygallium phthalocyanine crystal was the same as FIG. 2.

In addition, NMR measurement confirmed that Exemplified Compound (1) was incorporated at 0.82% into the crystal.

Example 1-3

Figure 3:
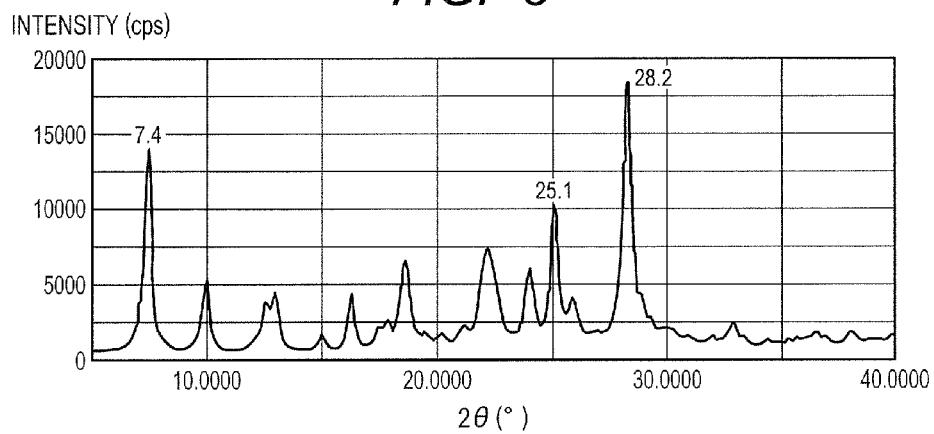
FIG. 3 is a powder X-ray diffraction pattern of a hydroxygallium phthalocyanine crystal obtained in Example 1-3.

0.35 Part of a hydroxygallium phthalocyanine crystal was obtained by the same treatment as that of Example 1-1 except that in Example 1-1, 10 parts of N,N-dimethylformamide were changed to 10 parts of dimethyl sulfoxide. FIG. 3 shows the powder X-ray diffraction pattern of the resultant hydroxygallium phthalocyanine crystal.

In addition, NMR measurement confirmed that Exemplified Compound (1) was incorporated at 0.83% into the crystal.

Example 1-4

0.42 Part of a hydroxygallium phthalocyanine crystal was obtained by the same treatment as that of Example 1-1 except that in Example 1-1, 10 parts of N,N-dimethylformamide were changed to 10 parts of N-methyl-2-pyrrolidone. The powder X-ray diffraction pattern of the resultant hydroxygallium phthalocyanine crystal was the same as FIG. 3.

In addition, NMR measurement confirmed that Exemplified Compound (1) was incorporated at 1.67% into the crystal.

Example 1-5

0.46 Part of a hydroxygallium phthalocyanine crystal was obtained by the same treatment as that of Example 1-1 except that in Example 1-1, 1.0 part of Exemplified Compound (1) was changed to 0.5 part of Exemplified Compound (2) (product code: B0139, manufactured by TOKYO CHEMICAL INDUSTRY CO., LTD.) and the milling treatment time was changed from 40 hours to 55 hours. The powder X-ray diffraction pattern of the resultant hydroxygallium phthalocyanine crystal was the same as FIG. 3.

In addition, NMR measurement confirmed that Exemplified Compound (2) was incorporated at 0.16% into the crystal.

Example 1-6

0.37 Part of a hydroxygallium phthalocyanine crystal was obtained by the same treatment as that of Example 1-3 except that in Example 1-3, 1.0 part of Exemplified Compound (1) was changed to 0.5 part of Exemplified Compound (2). The powder X-ray diffraction pattern of the resultant hydroxygallium phthalocyanine crystal was the same as FIG. 2.

In addition, NMR measurement confirmed that Exemplified Compound (2) was incorporated at 0.30% into the crystal.

Example 1-7

Figure 4:
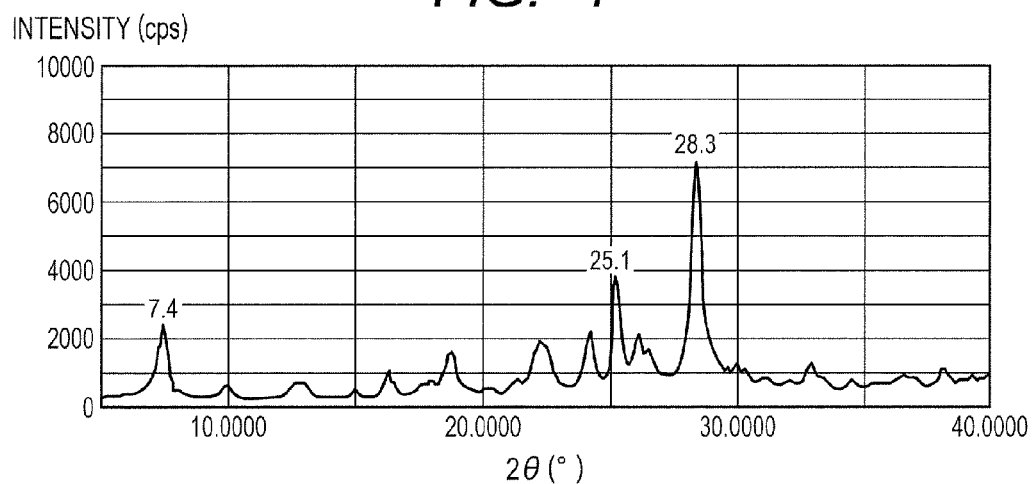
FIG. 4 is a powder X-ray diffraction pattern of a hydroxygallium phthalocyanine crystal obtained in Example 1-7.

0.46 Part of a hydroxygallium phthalocyanine crystal was obtained by the same treatment as that of Example 1-4 except that in Example 1-4, 1.0 part of Exemplified Compound (1) was changed to 0.5 part of Exemplified Compound (2). FIG. 4 shows the powder X-ray diffraction pattern of the resultant hydroxygallium phthalocyanine crystal.

In addition, NMR measurement confirmed that Exemplified Compound (2) was incorporated at 0.49% into the crystal.

Example 1-8

0.43 Part of a hydroxygallium phthalocyanine crystal was obtained by the same treatment as that of Example 1-1 except that in Example 1-1, 1.0 part of Exemplified Compound (1) was changed to 1.0 part of Exemplified Compound (3) (product code: B1212, manufactured by TOKYO CHEMICAL INDUSTRY CO., LTD.). The powder X-ray diffraction pattern of the resultant hydroxygallium phthalocyanine crystal was the same as FIG. 2.

In addition, NMR measurement confirmed that Exemplified Compound (3) was incorporated at 2.09% into the crystal.

Example 1-9

0.5 Part of a hydroxygallium phthalocyanine crystal was obtained by the same treatment as that of Example 1-1 except that in Example 1-1, 1.0 part of Exemplified Compound (1) was changed to 1.0 part of Exemplified Compound (4) (product code: B1433, manufactured by TOKYO CHEMICAL INDUSTRY CO., LTD.). The powder X-ray diffraction pattern of the resultant hydroxygallium phthalocyanine crystal was the same as FIG. 2.

In addition, NMR measurement confirmed that Exemplified Compound (4) was incorporated at 0.28% into the crystal.

Example 1-10

0.34 Part of a hydroxygallium phthalocyanine crystal was obtained by the same treatment as that of Example 1-1 except that in Example 1-1, 1.0 part of Exemplified Compound (1) was changed to 1.0 part of Exemplified Compound (24) obtained in synthesis example described above. The powder X-ray diffraction pattern of the resultant hydroxygallium phthalocyanine crystal was the same as FIG. 2.

In addition, NMR measurement confirmed that Exemplified Compound (24) was incorporated at 0.16% into the crystal.

Comparative Example 1-1

0.4 Part of a hydroxygallium phthalocyanine crystal was obtained by the same treatment as that of Example 1-1 except that in Example 1-1, 1.0 part of Exemplified Compound (1) was not added. The powder X-ray diffraction pattern of the resultant hydroxygallium phthalocyanine crystal was the same as FIG. 2.

Comparative Example 1-2

0.38 Part of a hydroxygallium phthalocyanine crystal was obtained by the same treatment as that of Example 1-1 except that in Example 1-1, 1.0 part of Exemplified Compound (1) was changed to 1.0 part of 4,4'-dimethoxybenzophenone.

Comparative Example 1-3

0.4 Part of a hydroxygallium phthalocyanine crystal was obtained by the same treatment as that of Example 1-1 except that in Example 1-1, 1.0 part of Exemplified Compound (1) was changed to 1.0 part of 3,3'-dinitrobenzophenone.

Comparative Example 1-4

0.14 Part of a hydroxygallium phthalocyanine crystal was obtained by the same treatment as that of Example 1-1 except that in Example 1-1, 1.0 part of Exemplified Compound (1) was changed to 1.0 part of benzophenone.

Comparative Example 1-5

0.8 Part of a mixture of a hydroxygallium phthalocyanine crystal and an anthraquinone crystal was obtained by the same treatment as that of Example 1-1 except that in Example 1-1, 1.0 part of Exemplified Compound (1) was changed to 1.0 part of anthraquinone.

Comparative Example 1-6

0.28 Part of a hydroxygallium phthalocyanine crystal was obtained by the same treatment as that of Example 1-3 except that in Example 1-3, 1.0 part of Exemplified Compound (1) was not added. The powder X-ray diffraction pattern of the resultant hydroxygallium phthalocyanine crystal was the same as FIG. 3.

Comparative Example 1-7

0.39 Part of a hydroxygallium phthalocyanine crystal was obtained by the same treatment as that of Example 1-4 except that in Example 1-4, 1.0 part of Exemplified Compound (1) was not added. The powder X-ray diffraction pattern of the resultant hydroxygallium phthalocyanine crystal was the same as FIG. 2.

Example 2-1

A solution formed of 60 parts of barium sulfate particles coated with tin oxide (trade name: PASSTRAN PC1, manufactured by MITSUI MINING & SMELTING CO., LTD.), 15 parts of titanium oxide particles (trade name: TITANIX JR, manufactured by TAYCA CORPORATION), 43 parts of a resole-type phenol resin (trade name: PHENOLITE J-325, manufactured by DIC Corporation, solid content: 70 mass %), 0.015 part of a silicone oil (trade name: SH28PA, manufactured by Dow Corning Toray Co., Ltd.), 3.6 parts of a silicone resin (trade name: TOSPEARL 120, manufactured by Momentive Performance Materials Inc.), 50 parts of 2-methoxy-1-propanol, and 50 parts of methanol was subjected to a dispersion treatment in a ball mill for 20 hours. Thus, a coating liquid for an electro-conductive layer was prepared.

The coating liquid for an electro-conductive layer was applied onto an aluminum cylinder (having a diameter of 24 mm) as a support by immersion and then the resultant applied film was dried for 30 minutes at 140° C. Thus, an electro-conductive layer having a thickness of 15 μm was formed.

Next, 10 parts of a copolymer nylon resin (trade name: AMILAN CM8000, manufactured by Toray Industries, Inc.)

and 30 parts of a methoxymethylated 6-nylon resin (trade name: TORESIN EF-30T, manufactured by Nagase ChemteX Corporation) were dissolved in a mixed solvent of 400 parts of methanol and 200 parts of n-butanol. Thus, a coating liquid for an undercoat layer was prepared.

The coating liquid for an undercoat layer was applied onto the electro-conductive layer by immersion and then the resultant applied film was dried. Thus, an undercoat layer having a thickness of 0.5 µm was formed.

Next, 10 parts of the hydroxygallium phthalocyanine crystal (charge-generating substance) obtained in Example 1-1, 5 parts of a polyvinyl butyral (trade name: S-LEC BX-1, manufactured by SEKISUI CHEMICAL CO., LTD.), and 250 parts of cyclohexanone were loaded into a sand mill using glass beads each having a diameter of 1 mm, and were then subjected to a dispersion treatment for 1 hour. The treated product was diluted with 250 parts of ethyl acetate. Thus, a coating liquid for a charge-generating layer was prepared.

The coating liquid for a charge-generating layer was applied onto the undercoat layer by immersion and then the resultant applied film was dried for 10 minutes at 100° C. Thus, a charge-generating layer having a thickness of 0.16 µm was formed.

Next, 8 parts of a compound (charge-transporting substance) represented by the following formula (4) and 10 parts of a polycarbonate (trade name: IUPILON Z-200, manufactured by MITSUBISHI GAS CHEMICAL COMPANY, INC.) were dissolved in 70 parts of monochlorobenzene. Thus, a coating liquid for a charge-transporting layer was prepared.

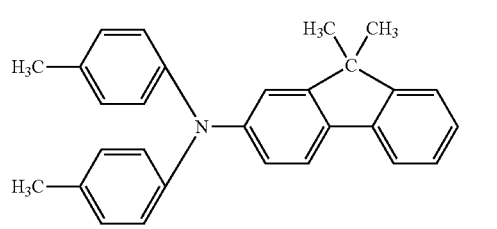

(4)

The coating liquid for a charge-transporting layer was applied onto the charge-generating layer by immersion and then the resultant applied film was dried for 1 hour at 110° C. Thus, a charge-transporting layer having a thickness of 23 µm was formed.

Thus, a cylindrical (drum-shaped) electrophotographic photosensitive member of Example 2-1 was produced.

Example 2-2

An electrophotographic photosensitive member of Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-2.

Example 2-3

An electrophotographic photosensitive member of Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-3.

Example 2-4

An electrophotographic photosensitive member of Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-4.

Example 2-5

An electrophotographic photosensitive member of Example 2-5 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-5.

Example 2-6

An electrophotographic photosensitive member of Example 2-6 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-6.

Example 2-7

An electrophotographic photosensitive member of Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-7.

Example 2-8

An electrophotographic photosensitive member of Example 2-8 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-8.

Example 2-9

An electrophotographic photosensitive member of Example 2-9 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-9.

Example 2-10

An electrophotographic photosensitive member of Example 2-10 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Example 1-10.

Comparative Example 2-1

An electrophotographic photosensitive member of Comparative Example 2-1 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-1.

Comparative Example 2-2

An electrophotographic photosensitive member of Comparative Example 2-2 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-2.

Comparative Example 2-3

An electrophotographic photosensitive member of Comparative Example 2-3 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-3.

Comparative Example 2-4

An electrophotographic photosensitive member of Comparative Example 2-4 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-4.

Comparative Example 2-5

An electrophotographic photosensitive member of Comparative Example 2-5 was produced in the same manner as in Example 2-1 except that in Example 2-1, the hydroxygallium phthalocyanine crystal used in the preparation of the coating liquid for a charge-generating layer was changed to the mixture obtained in Comparative Example 1-5.

Comparative Example 2-6

An electrophotographic photosensitive member of Comparative Example 2-6 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-6.

Comparative Example 2-7

An electrophotographic photosensitive member of Comparative Example 2-7 was produced in the same manner as in Example 2-1 except that in Example 2-1, the hydroxygallium phthalocyanine crystal used in the preparation of the coating liquid for a charge-generating layer was changed to the hydroxygallium phthalocyanine crystal obtained in Comparative Example 1-7.

(Evaluations of Examples 2-1 to 2-10 and Comparative Examples 2-1 to 2-7)

The electrophotographic photosensitive members of Examples 2-1 to 2-10 and Comparative Examples 2-1 to 2-7 were subjected to a photosensitivity characteristic evaluation and a ghost image evaluation.

(Photosensitivity Characteristic Evaluation)

Figure 5:
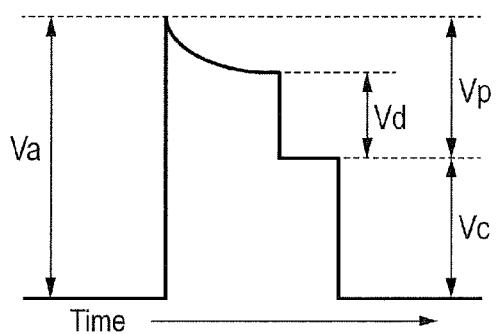
FIG. 5 is a view concerning the evaluations of an electrophotographic photosensitive member for its sensitivity and residual potential.

The photosensitivity characteristics of the electrophotographic photosensitive members produced as described above were measured with a direct voltage impression-type electrophotographic photosensitive member-measuring apparatus using a curved NESA glass. It should be noted that a measurement sequence was the sequence of a capacitor model in which an electrophotographic photosensitive member was regarded as a capacitor. The measurement is advanced as illustrated in FIG. 5. Specifically, first, in order to remove the hysteresis of the electrophotographic photosensitive member, the electrophotographic photosensitive member was irradiated with exposure light (image exposure light) and pre-exposure light, and 10 milliseconds thereafter, a predetermined applied voltage (Va) was applied to the electrophotographic photosensitive member. Next, 20 milliseconds thereafter, its electric potential (Vd+Vc) was measured, and after the measurement, the electric potential of the electrophotographic photosensitive member was grounded. Next, an electric potential (Vc) shared by the capacitor inserted into the measuring instrument was measured and a surface potential (Vd) determined from these results was defined as the electric potential of the electrophotographic photosensitive member. It should be noted that 20 milliseconds after the time point when the Vd reached −700 V, the electrophotographic photosensitive member was irradiated with light having an image exposure wavelength of 778 nm obtained by dispersing halogen light with a 778-nm interference filter for 100 milliseconds, and 395 milliseconds thereafter, its surface potential was measured. Its photosensitivity (Δ500) was determined from the light quantity ($cJ/m^2$) when the surface potential reached −200 V as a result of the exposure (image exposure). In addition, a surface potential 500 milliseconds after 100 milliseconds of irradiation with halogen light having an illuminance of 1,600 Lux (the pre-exposure light) was defined as a residual potential. Table 1 shows the results of the evaluation.

(Ghost Image Evaluation)

Used as an electrophotographic apparatus for the evaluation was a laser beam printer manufactured by Hewlett-Packard Japan, Ltd. (trade name: Color Laser Jet CP3525dn) reconstructed as described below. That is, the printer was reconstructed so as to operate while pre-exposure was not turned on, and a charging condition and an image exposure value were variable. In addition, the printer was reconstructed so as to operate when the produced electrophotographic photosensitive members was mounted on a process cartridge for a cyan color and the cartridge was attached to a station for the cyan process cartridge, and a process cartridge for any other color was not mounted on the main body of the printer.

Upon output of an image, only the process cartridge for a cyan color was attached to the main body and a monochromatic image formed with a cyan toner alone was output.

First, under a normal-temperature, normal-humidity environment having a temperature of 23° C. and a relative humidity of 55% RH, the charging condition and the image exposure value were adjusted so that a dark portion potential and a light portion potential at an initial stage were −500 V and −100 V, respectively. The surface potential of the drum-shaped electrophotographic photosensitive member upon setting of an electric potential was measured as described below. The cartridge was reconstructed, a potential probe (trade name: model 6000B-8, manufactured by TREK JAPAN) was mounted at a development position, and an electric potential at the central portion of the cylindrical electrophotographic photosensitive member was measured with a surface potentiometer (trade name: model 344, manufactured by TREK JAPAN).

After that, the ghost image evaluation was performed under the same conditions. After that, a 1,000-sheet-passing durability test was performed, and the ghost image evaluation was performed immediately after the durability test and 15 hours after the durability test. Table 2 shows the results of the evaluation under the normal-temperature, normal-humidity environment.

Next, the electrophotographic photosensitive member was left to stand under a low-temperature, low-humidity environment having a temperature of 15° C. and a relative humidity of 10% RH for 3 days together with the electrophotographic apparatus for the evaluation. After that, the ghost image evaluation was performed. Then, the 1,000-sheet-passing durability test was performed under the same condition, and the ghost image evaluation was performed immediately after the durability test and 15 hours after the durability test. Table 2 shows the results of the evaluation under the low-temperature, low-humidity environment together.

It should be noted that the sheet-passing durability test was performed under such a condition that an E-letter image was printed on A4-size plain paper at a print percentage of 1% with a cyan color alone.

In addition, a method for the ghost image evaluation is as described below.

The ghost image evaluation was performed with a total of eight ghost images output in the following order. A solid white image was output on the first sheet. After that, four kinds of ghost charts were each output on one sheet, i.e., were output on a total of four sheets. Next, a solid black image was output on one sheet. After that, the four kinds of ghost charts were each output on one sheet, i.e., were output on a total of four sheets again. The ghost charts to be classified into ranks were as described below. Four solid black squares 25 mm on a side were arranged at an equal interval and parallel to one another in a solid white background ranging from a print image starting position (10 mm from the upper end of paper) to a distance of 30 mm, and in a range distant from the print image starting position by more than 30 mm, four kinds of halftone print patterns were output.

The four kinds of ghost charts are charts different from one another only in halftone pattern in the range distant from the print image starting position by more than 30 mm, and the halftone patterns are the following four kinds:

(1) a print (laser exposure) pattern in which one dot is laterally* printed every other space;

(2) a print (laser exposure) pattern in which two dots are laterally* printed every two spaces;

(3) a print (laser exposure) pattern in which two dots are laterally* printed every three spaces; and (4) a print (laser exposure) pattern of a knight pattern (a pattern in which two dots are printed on six squares like the movement of a knight in Japanese chess).

*: The term "laterally" refers to the scanning direction of a laser scanner (the horizontal direction in output paper).

The ghost images were classified into ranks as described below. It should be noted that it was judged that the effect of the present invention was not sufficiently obtained at each of the ranks 4, 5, and 6.

Rank 1: No ghost is observed in each ghost chart.
Rank 2: A ghost is slightly observed in a specific ghost chart.
Rank 3: A ghost is slightly observed in each ghost chart.
Rank 4: A ghost is observed in a specific ghost chart.
Rank 5: A ghost is observed in each ghost chart.
Rank 6: A ghost is clearly observed in a specific ghost chart.

TABLE 1

Results of photosensitivity characteristic evaluation

|  | Photosensitivity characteristic | |
| --- | --- | --- |
|  | $\Delta 500$ (cJ/m$^2$) | Residual potential (− V) |
| Example 2-1 | 0.18 | 10 |
| Example 2-2 | 0.19 | 10 |
| Example 2-3 | 0.15 | 27 |
| Example 2-4 | 0.18 | 29 |
| Example 2-5 | 0.17 | 32 |
| Example 2-6 | 0.17 | 36 |
| Example 2-7 | 0.19 | 37 |
| Example 2-8 | 0.19 | 20 |
| Example 2-9 | 0.19 | 26 |
| Example 2-10 | 0.19 | 25 |
| Comparative Example 2-1 | 0.21 | 39 |
| Comparative Example 2-2 | 0.21 | 27 |
| Comparative Example 2-3 | 0.20 | 19 |
| Comparative Example 2-4 | 0.20 | 20 |
| Comparative Example 2-5 | 0.41 | 26 |
| Comparative Example 2-6 | 0.20 | 39 |
| Comparative Example 2-7 | 0.20 | 49 |

TABLE 2

Results of ghost image evaluation

|  | Under normal-temperature, normal-humidity environment | | | Under low-temperature, low-humidity environment | | |
| --- | --- | --- | --- | --- | --- | --- |
|  | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Example 2-1 | 2 | 3 | 2 | 2 | 3 | 3 |
| Example 2-2 | 2 | 3 | 2 | 2 | 3 | 2 |
| Example 2-3 | 2 | 3 | 2 | 2 | 3 | 2 |
| Example 2-4 | 2 | 3 | 3 | 3 | 3 | 3 |
| Example 2-5 | 1 | 2 | 2 | 1 | 2 | 2 |
| Example 2-6 | 1 | 2 | 2 | 2 | 2 | 2 |
| Example 2-7 | 2 | 2 | 2 | 2 | 3 | 3 |
| Example 2-8 | 2 | 3 | 2 | 2 | 3 | 3 |
| Example 2-9 | 2 | 3 | 3 | 2 | 3 | 3 |
| Example 2-10 | 2 | 2 | 1 | 1 | 2 | 2 |
| Comparative | 4 | 5 | 4 | 5 | 6 | 5 |

TABLE 2-continued

Results of ghost image evaluation

| | Under normal-temperature, normal-humidity environment | | | Under low-temperature, low-humidity environment | | |
|---|---|---|---|---|---|---|
| | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Example 2-1 | | | | | | |
| Comparative Example 2-2 | 3 | 4 | 4 | 4 | 5 | 5 |
| Comparative Example 2-3 | 5 | 6 | 5 | 6 | 6 | 6 |
| Comparative Example 2-4 | 3 | 4 | 4 | 4 | 5 | 4 |
| Comparative Example 2-5 | Unable to evaluate owing to poor sensitivity | | | | | |
| Comparative Example 2-6 | 4 | 6 | 6 | 5 | 6 | 6 |
| Comparative Example 2-7 | 4 | 5 | 5 | 5 | 6 | 6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-262020, filed Nov. 30, 2011, and Japanese Patent Application No. 2012-244472, filed Nov. 6, 2012, which are hereby incorporated by reference herein in their entirety.

What is claimed is:

1. A method of producing a gallium phthalocyanine crystal, comprising
providing a low-crystalline hydroxygallium phthalocyanine treated by an acid pasting method;
providing a dispersion by dispersing the low-crystalline hydroxygallium phthalocyanine and an amine compound represented by the following formula (1) into an amide solvent or a sulfoxide solvent, and
subjecting the dispersion to a milling treatment to conduct a crystal transformation of the low-crystalline hydroxygallium phthalocyanine, and obtaining a hydroxygallium phthalocyanine crystal containing the amine compound represented by the formula (1) in the crystal:

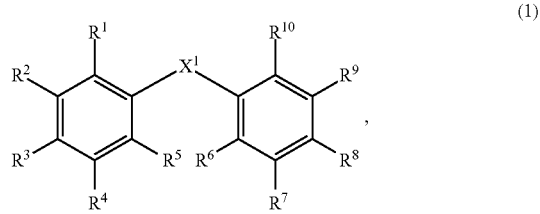

(1)

and
wherein in the formula (1):
$R^1$ to $R^{10}$ each independently represent a hydrogen atom, a halogen atom, an aryloxycarbonyl group, a substituted or unsubstituted acyl group, a substituted or unsubstituted alkyl group, a substituted or unsubstituted alkoxy group, a substituted or unsubstituted aryloxy group, an amino group having a substituent, or a substituted or unsubstituted cyclic amino group, provided that at least one of $R^1$ to $R^{10}$ represents an amino group substituted with a substituted or unsubstituted aryl group, an amino group substituted with a substituted or unsubstituted alkyl group, or a substituted or unsubstituted cyclic amino group; and
$X^1$ represents a carbonyl group or a dicarbonyl group.

2. The method of producing a gallium phthalocyanine crystal according to claim 1, wherein at least one of $R^1$ to $R^{10}$ represents an amino group substituted with a substituted or unsubstituted alkyl group.

3. The method of producing a gallium phthalocyanine crystal according to claim 2, wherein the substituted or unsubstituted alkyl group in the amino group substituted with the substituted or unsubstituted alkyl group comprises an alkyl group substituted with an alkoxy group, an alkyl group substituted with an aryl group, or an unsubstituted alkyl group.

4. The method of producing a gallium phthalocyanine crystal according to claim 3, wherein the amino group substituted with the substituted or unsubstituted alkyl group comprises a dialkylamino group.

5. The method of producing a gallium phthalocyanine crystal according to claim 4, wherein the dialkylamino group comprises a dimethylamino group or a diethylamino group.

6. The method of producing a gallium phthalocyanine crystal according to claim 5, wherein the amine compound comprises an amine compound represented by the following formula (2):

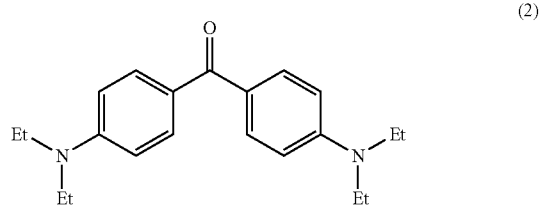

(2)

in the formula (2), Et represents an ethyl group.

7. The method of producing a gallium phthalocyanine crystal according to claim 1, wherein at least one of $R^1$ to $R^{10}$ represents a substituted or unsubstituted cyclic amino group.

8. The method of producing a gallium phthalocyanine crystal according to claim 7, wherein the substituted or unsubstituted cyclic amino group comprises a morpholino group or a 1-piperidino group.

9. The method of producing a gallium phthalocyanine crystal according to claim 8, wherein the amine compound comprises an amine compound represented by the following formula (3)

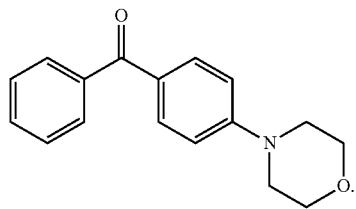

(3)

10. The method of producing a gallium phthalocyanine crystal according to claim 1, wherein the hydroxygallium phthalocyanine crystal comprises a hydroxygallium phthalocyanine crystal having peaks at Bragg angles 2θ±0.2° of 7.4° and 28.3° in CuKα X-ray diffraction.

11. The method of producing a gallium phthalocyanine crystal according to claim 1, wherein the amide solvent comprises N,N-dimethylformamide and the sulfoxide solvent comprises dimethyl sulfoxide.

12. A method of producing an electrophotographic photosensitive member including an electric-conductive support, and a photosensitive layer formed on the electric-conductive support, the photosensitive layer containing a hydroxygallium phthalocyanine crystal, the method comprising:
  producing the hydroxygallium phthalocyanine crystal by the production method according to claim 1;
  preparing a mixed liquid comprising the hydroxygallium phthalocyanine crystal and a binder resin; and
  applying the mixed liquid onto the electric-conductive support as a film and drying the resultant applied film to form the photosensitive layer.

* * * * *